Patented June 7, 1938

2,119,822

UNITED STATES PATENT OFFICE 2,119,822

PROCESS FOR MANUFACTURING A POWDERED PRODUCT FROM MUCILAGINOUS SUBSTANCE OF EEL

Toichiro Mayehara, Omori-ku, Tokyo, Japan

No Drawing. Application December 9, 1936, Serial No. 115,055

2 Claims. (Cl. 99—15)

This invention relates to a process for manufacturing a powdered product from the mucilaginous substances of eel, characterized in that a suitable receptacle is provided for containing the live eel, upon which hot water is injected, the liquid being then stirred and churned and when the mucilaginous substances of the flesh of the eel have become a white-coloured muddy consistency the flesh is then removed in order that the muddy consistency remaining in the receptacle may be matured by means of vapour, furthermore, cooled, frozen and solidified, the resulting substance, after being ground into powder, is treated with a solution of acid earth, dried by suitable means and further pulverized finely.

The object of the invention is to produce a special nutriment in large quantities, low in price and unchangeable in quality.

The process of the invention is carried out in detail as follows.

The first step

The live eel placed in a circular receptacle is treated with hot water between 45° and 50° C., the water being quickly stirred or agitated.

At the moment the mucilaginous substances of the flesh of the eel have become a white-coloured and muddy substance, the eel is removed by suitable means so that a pure and unadulterated muddy substance is obtained.

However, this muddy substance still contains some lumps mingled therewith so that the substance can not be heated uniformly.

Therefore, the substance must be evaporated to effect uniform heating, which simultaneously causes the water contained in the muddy substance to be driven off, thereby producing a substance of greater density.

The second step

This more dense substance is very mucilaginous and substantial, accordingly very smooth and slippery, in addition, so many lumps still remain intermingled that it is impossible to produce a muddy substance of a uniform concentration without further processing.

Therefore, the muddy substance is cooled to freeze and solidify and this mucilaginous substance is ground as finely as possible during the above-operated low temperature and at the same time, the grinding operation is assisted by the individual friction of the particles, thereby producing the purer substance of a uniform concentration.

The concentration of the muddy substance is thus rendered uniform during the second step preparatory to the elimination of the fatty oil during the third step and the drying of the substance during the fourth step.

The third step

The muddy substance obtained according to the second step is immersed in a white-coloured and defecated solution of acid earth, which has been immersed in hot water, the solution being stirred and churned at times and kept untouched for 20 to 24 hours, then it will become cotton-like, whereby the fatty oil contained therein is gradually separated and becomes white flake particle so that it adheres to the inside surface of the receptacle and the pure white cotton-like substance floating at the lower portion of the receptacle can be taken out by suitable means at suitable time and washed out with water.

The third step is intended to prevent the quality of the eel extract from undergoing change, because the powder obtained from the mucilaginous substance of the eel generally contains 4 to 5 percent of fatty oil and is subjected to change in quality.

The fourth step

The cotton-like substance obtained according to the third step is dried and crushed, so as to produce a powder by suitable means, whereby the whole operations have been completed.

The powdered product obtained in this manner is a special nutriment useful especially for people of lymphatic constitution, the above mentioned fact having been testified to experimentally.

On the other hand, this powdered product, having been fully freed of fatty oil, is not subjected to change in quality, consequently, its curative effects are assured.

It is not yet clear however why the solution of acid earth which has been immersed in hot water is so effective for getting rid of the fatty oil intermingled in the eel as described above.

Nevertheless, it is evident that the above described solution has been very effective experimentally and there is no reason to doubt the fact that the process of the invention can not be found among any other precedented examples of a similar art.

What I claim is:

1. A process for manufacturing a powdered product from the mucilaginous substances of eel, comprising treating an eel with hot water, agitating the water containing the eel until a white pasty substance is formed, removing the eel, concentrating the pasty substance by evaporation, solidifying the concentrate by freezing same, grinding the solid concentrate into powdered form, washing and purifying the powder with a hot water solution of Japanese acid clay, drying the powder and finally pulverizing the dried powder.

2. A process for manufacturing a powdered product from the mucilaginous substances of eel, comprising treating an eel with hot water, agitating the water containing the eel until a white pasty substance is formed, removing the eel, concentrating the pasty substance by evaporation, solidifying the concentrate by freezing same, grinding the solid concentrate into powdered form, washing and purifying the powder with a hot water solution of Japanese acid clay, separating the product from the acid clay solution, drying the product and finally pulverizing the dried product into a powder.

TOICHIRO MAYEHARA.